United States Patent
Baugh et al.

(10) Patent No.: US 9,186,618 B2
(45) Date of Patent: Nov. 17, 2015

(54) IONIC LIQUIDS AS AMINE PROMOTER SOLVENTS FOR REMOVAL OF CARBON DIOXIDE

(75) Inventors: Lisa S. Baugh, Ringoes, NJ (US); Pavel Kortunov, Flemington, NJ (US); David C. Calabro, Bridgewater, NJ (US); Michael Siskin, Westfield, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 1063 days.

(21) Appl. No.: 13/228,734

(22) Filed: Sep. 9, 2011

(65) Prior Publication Data
US 2012/0063978 A1    Mar. 15, 2012

Related U.S. Application Data

(60) Provisional application No. 61/381,294, filed on Sep. 9, 2010, provisional application No. 61/381,281, filed on Sep. 9, 2010, provisional application No. 61/381,351, filed on Sep. 9, 2010, provisional application No. 61/420,960, filed on Dec. 8, 2010, provisional application No. 61/420,978, filed on Dec. 8, 2010, provisional application No. 61/421,048, filed on Dec. 8, 2010.

(51) Int. Cl.
*B01D 53/62*    (2006.01)
*B01D 53/78*    (2006.01)
(Continued)

(52) U.S. Cl.
CPC ........ *B01D 53/1475* (2013.01); *B01D 53/1493* (2013.01); *B01D 53/62* (2013.01); *B01D 2252/2056* (2013.01); *B01D 2252/20415* (2013.01); *B01D 2252/20421* (2013.01); *B01D 2252/20426* (2013.01); *B01D 2252/20431* (2013.01); *B01D 2252/20478* (2013.01); *B01D 2252/30* (2013.01); *Y02C 10/04* (2013.01); *Y02C 10/06* (2013.01)

(58) Field of Classification Search
None
See application file for complete search history.

(56) References Cited

U.S. PATENT DOCUMENTS 3,347,621 A    10/1967  Papadopoulos et al.
3,794,586 A    2/1974   Kimura et al.
(Continued)

FOREIGN PATENT DOCUMENTS

CN    1354036    6/2002
CN    101279181  10/2008
(Continued)

OTHER PUBLICATIONS

"Appendix C: Dissociation Constants and pKa Values for Acids at 25 deg.C." CRC Handbook of Chemistry and Physics, 84th Ed. (2004) (excerpt).*

(Continued)

*Primary Examiner* — Stuart Hendrickson
*Assistant Examiner* — Daniel Berns
(74) *Attorney, Agent, or Firm* — Bruce M. Bordelon; David M. Weisberg; Andrew T. Ward

(57) ABSTRACT

Ionic liquids are capable of acting as solvents for amine $CO_2$ absorbent compounds in $CO_2$ separation processes and when so used enhance the sorption of the $CO_2$ by the amine. A cyclic sorption process for separating $CO_2$ from a gas stream, such as flue gas or natural gas, brings the gas stream into contact with an absorbent solution of an amine $CO_2$ sorbent in an ionic liquid solvent followed by desorbing the $CO_2$ to regenerate the amine.

28 Claims, 4 Drawing Sheets

TGA weight loss curve for $CO_2$ saturated 50 wt% APN dissolved in 1-ethyl-3-methylimidazolium acetate

(51) Int. Cl.
　　　*B01D 53/96*　　(2006.01)
　　　*B01D 53/14*　　(2006.01)

(56) References Cited

U.S. PATENT DOCUMENTS

| | | | |
|---|---|---|---|
| 4,100,257 | A | 7/1978 | Sartori et al. |
| 4,112,051 | A | 9/1978 | Sartori et al. |
| 4,410,335 | A | 10/1983 | Childs |
| 4,474,682 | A | 10/1984 | Billenstein et al. |
| 4,539,189 | A | 9/1985 | Starkston et al. |
| 4,624,838 | A | 11/1986 | Pan et al. |
| 4,636,323 | A | 1/1987 | Nagai et al. |
| 5,057,122 | A | 10/1991 | Blain et al. |
| 5,068,046 | A | 11/1991 | Blain et al. |
| 5,565,145 | A | 10/1996 | Watson et al. |
| 5,879,433 | A | 3/1999 | Gallup et al. |
| 6,075,000 | A | 6/2000 | Rohrbaugh et al. |
| 6,140,276 | A | 10/2000 | Duncum et al. |
| 6,579,343 | B2 | 6/2003 | Brennecke et al. |
| 6,586,106 | B2 | 7/2003 | Shibuya et al. |
| 7,527,775 | B2 * | 5/2009 | Chinn et al. ............. 423/226 |
| 2002/0189444 | A1 | 12/2002 | Brennecke et al. |
| 2004/0035293 | A1 | 2/2004 | Davis, Jr. |
| 2005/0129598 | A1 | 6/2005 | Chinn et al. |
| 2005/0183337 | A1 | 8/2005 | Cadours et al. |
| 2005/0239974 | A1 | 10/2005 | Grimm et al. |
| 2005/0257421 | A1 | 11/2005 | Siggelkow et al. |
| 2006/0188423 | A1 | 8/2006 | Cadours et al. |
| 2006/0251558 | A1 | 11/2006 | Chinn et al. |
| 2007/0286783 | A1 | 12/2007 | Carrette et al. |
| 2008/0004362 | A1 | 1/2008 | Masuda et al. |
| 2008/0025893 | A1 | 1/2008 | Asprion et al. |
| 2008/0050296 | A1 | 2/2008 | Tontiwachwuthikul et al. |
| 2008/0141858 | A1 | 6/2008 | Liu et al. |
| 2008/0187485 | A1 | 8/2008 | Magne-Drisch et al. |
| 2009/0136402 | A1 | 5/2009 | Heldebrant et al. |
| 2009/0263302 | A1 | 10/2009 | Hu |
| 2009/0291872 | A1 * | 11/2009 | Bara et al. ............. 510/175 |
| 2009/0291874 | A1 | 11/2009 | Bara et al. |
| 2010/0288126 | A1 | 11/2010 | Agar et al. |
| 2011/0293498 | A1 | 12/2011 | Lahary et al. |

FOREIGN PATENT DOCUMENTS

| | | |
|---|---|---|
| DE | 3504538 | 9/1985 |
| DE | 102008007087 A1 | 8/2009 |
| DE | 102008013738 A1 | 9/2009 |
| EP | 0 349 787 B1 | 8/1994 |
| EP | 0692558 | 1/1996 |
| FR | 2918386 A1 | 7/2007 |
| GB | 1 473 103 A | 5/1977 |
| JP | 56145984 | 11/1981 |
| JP | 61225293 | 10/1986 |
| JP | 2003193385 | 7/2003 |
| JP | 2005126279 | 5/2005 |
| JP | 2006150298 | 6/2006 |
| JP | 2007197503 | 8/2007 |
| WO | 2006103812 A1 | 10/2006 |
| WO | 2007/003618 A1 | 1/2007 |
| WO | 2008/007320 A3 | 1/2008 |
| WO | 2008/015217 A1 | 2/2008 |
| WO | 2008068411 A2 | 6/2008 |
| WO | 2008/094846 A1 | 8/2008 |
| WO | 2010089257 A1 | 8/2010 |

OTHER PUBLICATIONS

Evans et al., "pKa's of Inorganic and Oxo-Acids." Published Nov. 4, 2005; available online at http://evans.rc.fas.harvard.edu/pdf/evans_pKa_table.pdf.*
S. Dinda et al., "Kinetics of reactive absorption of carbon dioxide with solutions of aniline in carbon tetrachloride and chloroform", Chemical Engineering Journal, 136 (2008), 349-357.
M. Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, 9 (2007), 90-98.
A.M. Voutchkova et al., "Imidazolium Carboxylates as Versatile and Selective N-Heterocyclic Carbene Transfer Agents: Synthesis, Mechanism, and Applications", J. Amer. Chem. Soc., 129 (2007), 12834-46.
I. Tommasi & F. Sorrentino, "Synthesis of 1,3-dialkylimidazolium-2-carboxylates by direct carboxylation of 1,3-dialkylimidazolium chlorides with CO2", Tetrahedron Letters, 47 (2006), 6453-6.
H.A. Duong et al., "Reversible carboxylation of N-heterocyclic carbenes", Chem. Commun., 2004, 112-3.
A. Tudose et al., "Imidazol(in)ium-2-carboxylates as N-heterocyclic carbene precursors in ruthenium-arene catalysts for olefin metathesis and cyclopropanation", J. Organomet. Chem., 691 (2006), 5356-65.
N.J. Bridges et al., "An Intermediate for the Clean Synthesis of Ionic Liquids: Isolation and Crystal Structure of 1,3-Dimethylimidazolium Hydrogen Carbonate Monohydrate", Chem. Eur., 13 (2007), 5207-12.
H. Zhou et al., "CO2 Adducts of N-Heterocyclic Carbenes: Thermal Stability and Catalytic Activity toward the Coupling of CO2 with Epoxides", J. Org. Chem., 73 (2008), 8039-44.
E. Sada et al., "Reaction Kinetics of Carbon Dioxide with Amines in Non-aqueous Solvents", Chemical Engineering Journal, 33 (1986), 87-95.
P.J. Carvalho et al., "Specific Solvation Interactions of CO2 on Acetate and Trifluoroacetate Imidazolium Based Ionic Liquids at High Pressures", J. Phys. Chem. B, 113 (2009), 6803-12.
C. Cadena et al., "Why is CO2 So Soluble in Imidazolium-Based Ionic Liquids?", J. Am. Chem. Soc., 126 (2004), 5300-8.
A. Yokozeki et al., "Physical and Chemical Absorptions of Carbon Dioxide in Room-Temperature Ionic Liquids", J. Phys. Chem. B, 112 (2008), 16654-63.
M.B. Shiflett et al., "Phase behavior of {carbon dioxide + [bmim][Ac]} mixtures", J. Chem. Thermo. 40 (2008), 25-31.
E.J. Maginn, "Design and Evaluation of Ionic Liquids as Novel CO2 Absorbents", University of Notre Dame Quarterly Technical Report, May 31, 2005, DOE Award No. DE-FG26-04NT42122.
Z.J. Dijkstra et al., "Formation of carbamic acid in organic solvents and in supercritical carbon dioxide", J. Supercritical Fluids, 41 (2007), 109-114.
K. Masuda et al., "Studies on the solvent dependence of the carbamic acid formation from omega-(1-naphthyl) alkylamines and carbon dioxide", Tetrahedron, 61 (2005), 213-229.
E.M. Hampe & D.M. Rudkevich, "Reversible covalent chemistry of CO2", Chem. Commun. (2002), 1450-51.
P.G. Jessop et al., "Reversible nonpolar-to-polar solvent", Nature, v. 436, Aug. 25, 2005, p. 1102.
D.J. Heldebrant et al., "Organic liquid CO2 capture agents with high gravimetric CO2 capacity", Energy & Environmental Science, 1 (2008), 487-93.
L. Phan et al., "Switchable Solvents Consisting of Amidine/Alcohol or Guanidine/Alcohol Mixtures", Ind. Eng. Chem. Res., 47 (2008), 539-45.
E.M. Hampe & D.M. Rudkevich, "Exploring reversible reactions between CO2 and amines", Tetrahedron, 59 (2003), 9619-25.
Y. Kayaki et al., "Utilization of N,N-Dialkylcarbamic Acid Derived from Secondary Amines and Supercritical Carbon Dioxide: Stereoselective Synthesis of Z Alkenyl Carbamates with a CO2-Soluble Ruthenium-P(OC2H5)3 Catalyst", Chem. Asian J., 3 (2008), 1865-70.
E. Sada et al., "Chemical Kinetics of the Reaction of Carbon Dioxide with Ethanolamines in Nonaqueous Solvents", AIChE Journal, 31(8), Aug. 1985, 1297-1303.
D.J. Heldebrant et al., "CO2-binding organic liquids (CO2BOLs) for post-combustion CO2 capture", Energy Procedia, 1 (2009), 1187-95.
G.F. Versteeg et al., "On the Kinetics Between CO2 and Alkanolamines both in Aqueous and Non-Aqueous Solutions. An Overview", Chem. Eng. Comm., 144 (1996), 113-58.
G.F. Versteeg & W.P.M. Van Swaaij, "On the Kinetics Between CO2 and Alkanolamines Both in Aqueous and Non-Aqueous Solutions—I. Primary and Secondary Amines", Chemical Engineering Science, 43(3), 1988, 573-85.

(56) References Cited

OTHER PUBLICATIONS

R.A. Davis & O.C. Sandall, "Kinetics of the Reaction of Carbon Dioxide With Secondary Amines in Polyethylene Glycol", Chemical Engineering Science, 48(18), 1993, 3187-93.
J.E. Bara et al., "Gas Processing With Ionic Liquid-Amine Solvents", URS Corporation (Denver, Colorado), 2010.
M. Kim & J.-W. Park, "Reversible, solid state capture of carbon dioxide by hydroxylated amidines", Chem. Commun., 46 (2010), 2507-9.
E.J. Maginn et al., "Development of new post-combustion carbon dioxide capture solvents: Are ionic liquids the answer?", 235th ACS National Meeting, Apr. 6-10, 2008, Abstract.
S. Dinda et al., "Kinetics of Reactive Absorption of Carbon Dioxide and Solutions of Aniline in Nonaqueous Aprotic Solvents", Ind. Eng. Chem. Res., 45 (2006), 6632-9.
D. Camper et al., "Room-Temperature Ionic Liquid-Amine Solutions: Tunable Solvents for Efficient and Reversible Capture of CO2", Ind. Eng. Chem. Res., 47 (2008), 8496-8.
J.E. Bara et al., "Guide to CO2 Separations in Imidazolium-Based Room-Temperature Ionic Liquids", Ind. Eng. Chem. Res., 48 (2009), 2739-51.
J.A. Tossell, "Catching CO2 in a Bowl", Inorganic Chemistry, 48 (2009), 7105-10.
H. Zhou et al., "N-Heterocyclic Carbene Functionalized Polymer for Reversible Fixation—Release of CO2", Macromolecules, 42 (2009), 5419-21.
Y. Ito, "Formation of Carbamic Acids and Their Photochemistry", Kokagaku Kyokai, 33(3), 2002, 205-12. English Abstract only.
N. Imaishi et al., "Chemical absorption of carbon dioxide by nonaqueous solutions of cyclohexylamine", Kagaku Kogaku Robunshu, 7(3), 1981, 261-6. English Abstract only.
D. Wan et al., "Can Nonspecific Host-Guest Interaction lead to Highly Specific Encapsulation by a Supramolecular Nanocapsule?", Macromolecules, 42 (2009), 6448-56.
V.L. Yushko et al., "Effect of water content on the solubility of carbon dioxide in solutions of monoethanolamine in sulfolane", Voprosy Khimii i Khimicheskoi Tekhnologii, 30 (1973), 3-5. English Abstract only.
E. Sada et al., "Chemical Absorption of Carbon Dioxide into Ethanolamine Solutions of Polar Solvent", AlChE Journal, 32(2), Feb. 1986, 347-9.
K. Yogish "Absorption of CO2 in Some Hybrid Solvents", Can. J. Chem. Eng., 68 (1990), 511-2.
P.S. Kumar et al., "New absorption liquids for the removal of CO2 from dilute gas streams using membrane contactors", Chem. Eng. Sci., 57 (2002), 1639-51.
K. Takeshita & A. Kitamoto, "Relation between separation factor of carbon isotope and chemical reaction of carbon dioxide with amine in nonaqueous solvent", J. Chem. Eng. Japan, 22(5), 1989, 447-54. English Abstract only.
K. Takeshita & A. Kitamoto, "Chemical equilibria of absorption of carbon dioxide into nonaqueous solution of amine", J. Chem. Eng. Japan, 21(4), 1988, 411-7. English Abstract only.
G.F. Versteeg & W.P.M. Van Swaaij, "On the Kinetics Between CO2 and Alkanolamines Both in Aqueous and Non-Aqueous Solutions—II. Tertiary Amines", Chemical Engineering Science, 43(3), 1988, 587-91.
O.R. Rivas, "Solvent selectivity for the purification of natural gases", Ph.D. Thesis, U.C. Berkeley, 1978, Abstract.
S. Xu et al., "Kinetics of the Reaction of Carbon Dioxide with 2-Amino-2-methyl-1-propanol Solutions", Chem. Eng. Sci., 51(6), 1996, 841-50.
R.J. Littell et al., "Physical absorption into non-aqueous solutions in a stirred cell reactor", Chem. Eng. Sci., 46(12), 1991, 3308-13.
I.L. Leites et al., "Removal of carbon dioxide from gas by solutions of monoethanolamine in various diluents", Khimicheskaya Promyshlennost, 8 (1975), 599-602. English Abstract only.
K. Takeshita et al., "Separation of carbon isotopes by using the chemical reaction of carbon dioxide with amines in nonaqueous solution", Kagaku Kogaku, 55(6), 1991, 426-8. English Abstract only.
Y. Liang et al., "Unimolecular Micelle Derived from hyperbranched Polyethyleneimine with Well-Defined Hybrid Shell of Poly(ethylene oxide) and Polystyrene: A Versatile Nanocapsule", J. Polym. Sci., Pt. A: Polym. Chem., 48 (2010), 681-91.
E.D. Bates et al., "CO2 Capture by a Task-Specific Ionic Liquid", J. Am. Chem. Soc., 124(6), 2002, 926ff.
J.D. Holbrey et al., "1,3-Dimethylimidazolium-2-carboxylate: the unexpected synthesis of an ionic liquid precursor and carbene-0O2 adduct", Chem. Commun., 2003, 28-29.
F. Karadas et al., "Review on the Use of Ionic Liquids (ILs) as Alternative Fluids for CO2 Capture and Natural Gas Sweetening", Energy Fuels, 24 (2010), 5817-28.
W.D. McGhee et al., "Palladium-Catalyzed Generation of O-Allylic Urethanes and Carbonates from Amines/Alcohols, Carbon Dioxide, and Allylic Chlorides", Organometallics, 12 (1993), 1429-33.
T. Yamada et al., "Reversible, Room-Temperature Ionic Liquids. Amidinium Carbamates Dervied from Amidines and Aliphatic Primary Amines with Carbon Dioxide", Chem. Mater., 19 (2007), 967-9.
T. Yamada et al., "Reversible, Room-Temperature Chiral Ionic Liquids. Amidinium Carbamates Dervied from Amidines and Amino-Acid Esters with Carbon Dioxide", Chem. Mater., 19 (2007), 4761-8.
T. Yu et al., "Carbon Dioxide and Molecular Nitrogen as Switches between Ionic and Uncharged Room-Temperature Liquids Comprised of Amidines and Chiral Amino Alcohols", Chem Mater., 20 (2008), 5337-44.
E.R. Perez et al., "Activation of Carbon Dioxide by Bicyclic Amidines", J. Org. Chem., 69 (2004), 8005-11.
A.R. Katritzky et al., "The N-Carboxylic Acids of Nitrogen Heterocycles", Heterocycles, 26 (1987), 1333-44.

\* cited by examiner

CO$_2$ uptake curves for EEA dissolved in 1-ethyl-3-methylimidazolium acetate (top) and toluene-$d_8$ (bottom).

CO₂ uptake curves for APN dissolved in 1-ethyl-3-methylimidazolium acetate (top) and toluene-$d_8$ (bottom).

TGA weight loss curve for $CO_2$ saturated 50 wt% APN dissolved in 1-ethyl-3-methylimidazolium acetate

IONIC LIQUIDS AS AMINE PROMOTER SOLVENTS FOR REMOVAL OF CARBON DIOXIDE

CROSS REFERENCE TO RELATED APPLICATIONS

This application claims the benefit of U.S. Provisional Application No. 61/381,294 filed Sep. 9, 2010, 61/381,281 filed Sep. 9, 2010, 61/381,351 filed Sep. 9, 2010, 61/420,960 filed Dec. 8, 2010, 61/420,978 filed Dec. 8, 2010, and 61/421,048 filed Dec. 8, 2010, the entire contents of each of which are hereby incorporated by reference herein.

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using a non-aqueous solution of an amine in an ionic liquid solvent as the sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents. Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210-345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate, also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known and while they may avoid many of the limitations of amine scrubbing, they suffer from a lack of absorbents having sufficiently selective $CO_2$ absorption under the conditions present in most commercial combustion flue gas processes.

SUMMARY OF THE INVENTION

We have now found that ionic liquids are capable of acting as solvents for amine $CO_2$ sorbents in $CO_2$ separation processes and when so used, enhance the sorption of the $CO_2$, increasing sorption capacity for a unit of given size.

According to the present invention therefore we provide a cyclic process for separating $CO_2$ from a gas stream which process comprises contacting the gas stream with an absorbent comprising a solution of one or more amine $CO_2$ sorbents in one or more ionic liquids, and regenerating the absorbent by treating it under conditions sufficient to cause desorption of at least a portion of the $CO_2$.

Ionic liquids have been discovered herein to be capable of promoting high levels of $CO_2$ sorption with suitable amines. In addition, the desorption of the $CO_2$ from the sorbent solution in embodiments herein may take place readily at low temperatures, providing for herein a low energy $CO_2$ capture process with its attendant economic advantages. The sorption may be carried out at low temperatures, e.g., ambient to 30° C., but if the entering gas stream is at a higher temperature, as with flue gas, the sorption may be carried out at temperatures up to about 90 or 100° C. while desorption will typically be carried out at temperatures no higher than 120° C. and desirably lower, e.g., no higher than 90° C. with low temperature sorption. The use of high temperatures, such as those required in the potassium carbonate absorption processes of the prior art, are unnecessary and no use of solid sorbents mixed with the liquids is required by the processes herein, i.e., the sorption/desorption cycles of the processes of invention herein do not require the use of solid sorbents.

DETAILED DESCRIPTION OF THE EMBODIMENTS

The methods of this disclosure involve removing $CO_2$ and/or other acid gases, such as $H_2S$, from a gas stream containing one or more of these gases using an ionic liquid promoter solvent in conjunction with an amine absorbent. The gas stream, typically a flue gas from the combustion of a carbonaceous fossil fuel such as natural gas, oil, and/or coal, can be brought into contact with an absorbent solution of an amine $CO_2$ sorbent in an ionic liquid promoter solvent under conditions that can effect the removal of the $CO_2$ by improved absorption via the amine sorbent component. Other acid gases which may be present in the gas stream may also be absorbed under the same conditions and thus effectively removed from the gas stream. Subsequently, the absorbed gas can be desorbed by adjustment of the conditions, for example, by increase in temperature, decrease in pressure, and/or by reduction of partial pressure of the desorbed component by stripping. The process can normally be carried out in a cyclic absorption-desorption process cycle in which the sorption is carried out in one tower, with the $CO_2$-rich ionic liquid/amine solution conveyed to a desorption/regeneration tower wherein the $CO_2$ and other absorbed gases may be desorbed from the solution and removed for use or disposal.

Cyclic Process Unit

Figure 1:
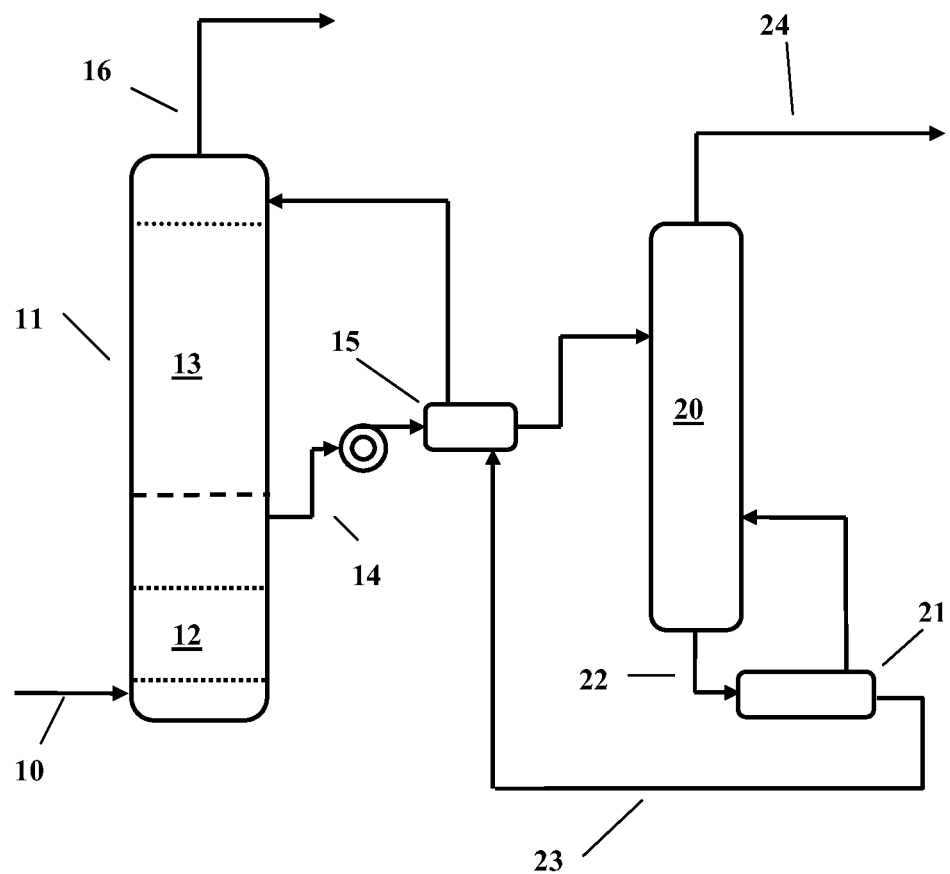
FIG. 1 is a simplified schematic of an embodiment of a cyclic separation unit suitable for separating $CO_2$ from a flue gas stream in accordance with a process of the present invention.

FIG. 1 shows a representative simplified schematic of a continuous cyclic gas separation unit which may be used for separating $CO_2$ from flue gas streams, natural gas streams, and other streams using the present ionic liquid/amine absorption medium. The hot flue gas stream can enter the unit by way of line 10, entering near the bottom of absorber tower 11 and preferably passing through a cooling section 12, in which its temperature can be reduced by direct or indirect cooling to bring it to a suitable temperature for the sorption step which follows. In an alternative embodiment, the cooling of the hot flue gas stream can be achieved prior to the stream entering the absorber tower 11.

From here, the gas stream can pass into sorption section 13 in countercurrent contact with a descending stream of the amine/ionic liquid sorbent solution. At least part of the $CO_2$, along with other gases which are amenable to absorption in the solution, can be absorbed into the sorbent solution resulting in a "rich" solution 14 containing the sorbed $CO_2$ which can be removed with a separation tray (not shown) near the lower end of the sorption section. The rich solution can then pass through heat exchanger 15 to desorption/regeneration tower 20 in which the $CO_2$ and other gases can be desorbed, in this case, by an increase in temperature, decrease in pressure, and/or the use of a purge (stripping gas), with agitation optionally but advantageously being provided by the stream of desorbed $CO_2$ and/or a purge gas. The rich solution can enter the tower at a level appropriate to its composition and can pass downwards as dissolved gases are removed. Heat for the regeneration tower can be supplied by reboiler 21 which can circulate a slipstream of solution taken from near the bottom of the regeneration tower by way of line 22. A stream of regenerated lean solution with a lower content of $CO_2$ can be taken from the reboiler in line 23 to pass through the other side of heat exchanger 15 before re-entering absorber tower 11 for passage through the gas stream. A gas stream of decreased $CO_2$ content can pass out of absorber tower 11 through line 16, and the desorbed $CO_2$ and other acid gases removed from the original gas stream can be removed in concentrated form through line 24 and taken to final sequestration or utilization (e.g., in industrial gas and/or in enhanced oil recovery processes).

Conventional equipment can be used to perform the various functions of the cyclic scrubbing process, such as monitoring and automatically regulating the flow of gases so that it can be fully automated to run continuously in an efficient manner.

$CO_2$/Amine Absorption Process

In the design of a practical $CO_2$ capture process, a number of issues need to be considered, including:

The efficiency of the capture process in terms of relative amount of absorbent required;

The efficiency of the capture process in terms of energy required for absorption/desorption; and Corrosion factors.

These issues are, of course, directly affected by the chemistry of the sorption/desorption processes. It is believed that the carbon atom of CO$_2$ is electron-deficient, making it susceptible to nucleophilic attack. In aqueous amine solution, the relative nucleophilicity of the amine and water can determine the reactive pathway. Nucleophilic addition can create a zwitterionic transition state, which can undergo an intramolecular proton transfer to a neutral acid. If water is the acting nucleophile, carbonic acid typically results; with an amine as the acting nucleophile, carbamic acid is generally formed. Subsequent reaction with a Bronsted base amine can lead to either an ammonium bicarbonate or an ammonium carbamate, respectively. Primary and secondary amines can exhibit both Lewis and Bronsted basicities in this scheme. Tertiary amines lack a proton for intramolecular transfer to form the acid intermediate, and therefore only exhibit Bronsted basicity in this chemistry. Further reaction of the carbamate with water may lead to a final bicarbonate product with a 1:1 CO$_2$:amine (CO$_2$:non-tertiary amine) ratio, or to a carbonate product with a 1:2 CO$_2$:amine (CO$_2$:non-tertiary amine) ratio (depending on solution pH). The conventional aqueous process is based on trying to control adsorption/desorption conditions to enhance fast carbamate formation while minimizing the formation of bicarbonates.

In non-aqueous systems incorporating primary and/or secondary amines, a zwitterion can form by nucleophilic attack of the lone pair of electrons on the nitrogen of the amine onto the carbon of the CO$_2$. Again, the zwitterion is usually unstable and can rapidly rearrange via proton transfer to the corresponding carbamic acid. Both the zwitterions and the carbamic acids can generally be unstable, and it is not known which equilibrium form undergoes further reaction, although it is posited that the CO$_2$ carbamic acid may be deprotonated by a second equivalent of free amine to produce an ammonium carbamate salt with the overall stoichiometric requirement of two moles of amine per one mole of carbon dioxide absorbed (0.5:1 CO$_2$:non-tertiary amine). This pathway can also be found in aqueous systems at early reaction stages, although there may be a different carbamate-carbamic acid equilibrium in non-aqueous systems, and, in the aqueous systems, there exists the possibility of further reaction with water to form bicarbonate and carbonate.

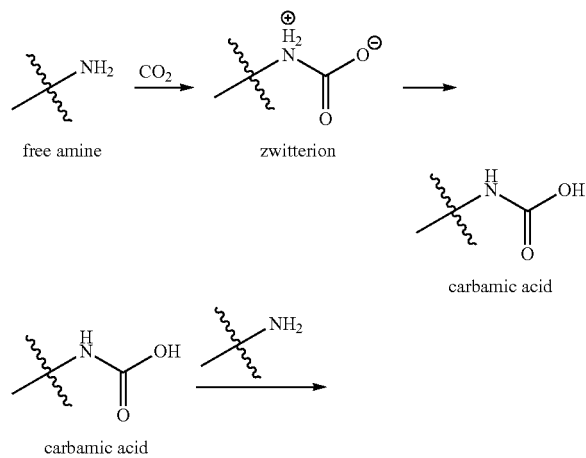

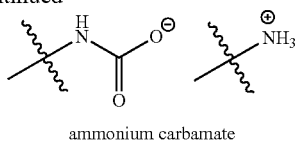

ammonium carbamate

While primary and secondary amines can form the carbamic acid/carbamate species in both aqueous and non-aqueous systems, tertiary amines are typically unable to do so, lacking the necessary proton for the transformation of the zwitterion to the carbamic acid. Also, it has been discovered herein that the carbamates formed from secondary amines can generally be less stable than those formed from primary amines.

It is believed that, if the amine is a sufficiently strong Lewis base, it may attack CO$_2$ directly to form the zwitterion intermediate described above, which can rapidly decompose via internal proton transfer to the carbamic acid. Carbamic acids are generally Bronsted acids that can typically react with a second mole of amine to form an ammonium carbamate. It appears that, in a non-aqueous system, it can be possible for the amine-CO$_2$ reaction to be dominated by Lewis acid-base chemistry (the transfer of electron pairs from a base to an acid), rather than Bronsted acid-base chemistry (proton transfer from an acid to a base). In this case, the reaction can proceed to form a carbamic acid product of sufficient stability that it can undergo only a limited degree of subsequent Bronsted reactivity to form an ammonium carbamate. This can result in an unexpected and beneficial increase in the amount of absorbed CO$_2$, in excess of the theoretical maximum predicted from complete ammonium carbamate formation. In any event, regardless of the exact nature of the reaction mechanism, we have found that, by using a non-aqueous absorbent, it is possible to absorb CO$_2$ at a ratio exceeding the 0.5:1 CO$_2$:(non-tertiary) amine ratio characteristic of carbamate formation. The amount of CO$_2$ sorbed into the solution may be at least 0.70 moles per non-tertiary amine group of the amine.

By operating in a non-aqueous system, e.g., by using the ionic liquid promoter solvents herein, it appears that the intermediate carbamic acid species may be stabilized relative to the ammonium carbamate species. By using this finding in an acid gas removal process, the benefit of an increased molar loading capacity of the sorbent amine above the theoretical maximum of 0.5:1 for ammonium carbamate formation has been achieved. CO$_2$:(non-tertiary) amine ratios approaching the theoretical carbamic acid ratio of 1:1 can be potentially achievable. In the case of primary amines, the highly polar and stabilizing effect of the ionic liquid solvent may lead to CO$_2$ sorption exceeding 100 mol % (CO$_2$ per amine group) as a result of double carboxylation onto the amine nitrogen(s); in addition, the ionic liquid has the potential to act as a chemisorbent for the CO$_2$ under appropriate conditions, leading to the sorption of additional amounts of CO$_2$. In combination with the significantly reduced corrosivity and a reduced amine regeneration energy afforded by the use of the ionic liquids as non-aqueous solvents, the present separation processes can provide substantial operational and economic benefits in comparison with conventional amine scrubbing technology.

Without being held to the hypothesis, it is believed that the mechanism for increased CO$_2$ capacity for amines can proceed through the formation of zwitterion and/or carbamic acid pairs, as well as through the isolated carbamic acids; it is possible that the pairs can in some manner be stabilized in non-aqueous ionic liquid solutions. Examples of these pairs could be as follows, with the zwitterionic (left) and carbamic acid (right) hydrogen-bonded pairs:

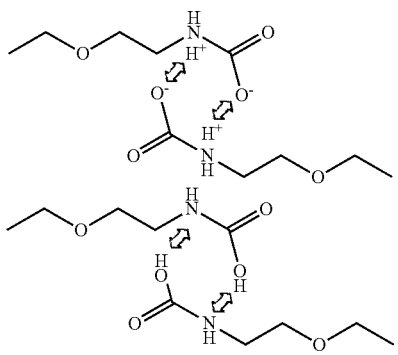

The ionic liquids can be used as "promoter solvents" in the processes herein, wherein they appear to be capable of inhibiting formation of the carbamate product in non-aqueous solvent based systems herein.

Gas Stream

The gas streams particularly amenable to treatment by the present sorption process can include flue gas from the combustion of carbonaceous fuels and/or natural gas from subterranean and other sources. Flue gas may originate from the combustion of carbon-containing fossil fuels such as natural gas, oils, and/or lignite, as well as sub-bituminous, bituminous, and/or anthracite coals. Its $CO_2$ content may typically vary from about 6 to about 15 weight percent, depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, neon, argon, krypton, hydrogen sulfide, and carbonyl sulfide, as well as, in some cases, mercury and/or other metal contaminants, if they have not been removed by other pre-treatment. Other streams that can be treated by the present separation process can include syngas and shifted syngas produced in fuel gasification processes and gas streams from petrochemical plants whose composition can naturally depend on the process from which they are derived.

The amount of carbon dioxide in the gas mixture can typically vary from about at least 1 percent upwards; in many streams, it can be at least 10 percent and may even be higher, as with some gas streams from natural gas fields such as the LaBarge (Wyoming) field, where the gas is about 66.5 percent carbon dioxide, about 20.5 percent methane, about 7.4 percent nitrogen, about 5.0 percent hydrogen sulfide, and about 0.6 percent helium.

The gas stream may optionally also be subjected to dehumidification prior to contacting with the absorbent materials and processes described herein. The dehumidification can be carried out by conventional methods by the use of a drying agent/absorber guard bed upstream of the acid gas scrubbing unit, and/or by carrying out the $CO_2$ absorption at temperatures above 100° C. using an absorbent capable of being regenerated above the absorption temperature. For example, the dehumidification can be carried out by absorption over solid sorbents such as salt dryers, molecular sieves, silica gels, and/or aluminas.

Amine Sorbents

Amines that may be used in the present sorption processes herein can include nucleophilic aliphatic primary or secondary amines, since they are able to participate in the initial formation of the zwitterion by nucleophilic attack onto the carbon of the $CO_2$ and its supposed subsequent transformation into the carbamic acid. Preferred amines can be those which have a $pK_a$ (acid dissociation equilibrium constant) of not more than about 10.5 (as measured/predicted at 25° C. in aqueous solution and/or as measured in other solvent and converted to an aqueous value, referred to as aqueous equivalent scale) with most of the useful amines having a $pK_a$ in the range of 5 to 10, in many cases from 5 to 8 or 5 to 9. Secondary amines, especially those in the preferred $pK_a$ range, may be used. Monoamines, diamines, and polyamines may be used, although diamines and polyamines may require the use of additional solvent to obviate the formation of high viscosity products in the presence of the $CO_2$. Substituted and unsubstituted alkyl amines may be used with substituent groups such as alkyl (usually lower $C_1$-$C_6$ alkyl), hydroxyalkyl (usually lower $C_1$-$C_6$ hydroxyalkyl), hydroxyl, alkoxy (usually lower $C_1$-$C_6$ alkoxy), aryl, and nitrile being the most common. Aryl substituents are preferably not present but, if present at all, should typically be positioned no closer than the beta carbon of the alkyl chain in order to maintain the aliphatic character of the amine by precluding delocalization of the lone pair on the amine nitrogen into the aromatic ring system. On the other hand, the presence of polar and/or electronegative substituents, such as nitrile, hydroxyl, etc., and/or of electronegative atoms and groups, especially oxygen, in the backbone chain of the amine, as in the etheramines, is believed to be favorable for interaction with the solvent, e.g., so as to avoid the formation of precipitates in otherwise soluble systems. Oxygen and other linking species may be in the chain, such as in 2-ethoxyethylamine (2EEA or EEA).

Amines finding use as $CO_2$ sorbents herein can include the alkanolamines, such as monoethanolamine (MEA), diethanolamine (DEA), 2-amino-2-methyl-1-propanol (AMP), and 2-(2-aminoethylamino)ethanol (AEE), as well as 1,5-diamino-3-oxapentane (DAOP), 1,5-bis(methylamino)-3-oxapentane (BMAP), 2-amino-2-hydroxymethyl-1,3-propanediol (Tris), and/or diisopropanolamine (DIPA). Other amines potentially useful in the present process can include, for example, diglycolamine (DGA), 2-n-propoxyethylamine, bis(2-methoxyethyl)amine, bis(2-ethoxyethyl)amine, 3-aminopropionitrile, 3,3'-iminodipropionitrile, aminoacetonitrile, and hydroxyethylenediamine (HEDA). Tertiary amines such as triethanolamine (TEA) and N-methyldiethanolamine (MDEA) are typically not used in view of their inability to form the carbamic acid in the absence of water. The use of primary amines can be preferred in some embodiments, in view of their ability to participate in a double carboxylation reaction on the amine nitrogen(s) in the presence of the (highly polar) ionic liquid solvent.

Additionally or alternately, polymeric (oligomeric) amines can be used as $CO_2$ sorbents herein, including polyalkyleneimines that are linear, cyclic, and/or branched, and that contain one or more secondary amines, optionally one or more primary amines, and optionally one or more tertiary amines. Non-limiting examples of such polyalkyleneimines can have a general repeat unit structure of $-[(CH_2)_x-NR]_y-$, where x is from 2 to 6, where y is from 4 to 50, and where each R is hydrogen (representing the situation where the backbone nitrogen is a secondary amine), an alkyleneamine branch having the structure $-(CH_2)_x-NH_2$ (representing the situation where the backbone nitrogen is a tertiary amine and where the resulting branch nitrogen is a primary amine), or an alkyleneimine branch having the structure —$(CH_2)_x$—$NR'_2$, where a first R' is an alkyleneamine branch or another alkyleneimine branch and a second R' is hydrogen (representing the situation where the backbone nitrogen is a tertiary amine and where the resulting branch nitrogen is a secondary amine), another alkyleneimine branch (representing the situation where the backbone nitrogen is a tertiary amine and where the resulting branch nitrogen is a tertiary amine, with the further branch nitrogen being a secondary or tertiary amine), or yet another alkyleneamine branch (also representing the situation where the backbone nitrogen is a tertiary amine and where the resulting branch nitrogen is a tertiary amine, with the further branch nitrogen being a primary amine). It should be understood herein that the subscript "y" represents the average number of repeat units in a linear polyalkyleneimine chain and thus is only meaningful as an average number; it is contemplated that the distribution of polymeric/oligomeric polyalkyleneimines can reflect some proportion of chains having higher or lower backbone/linear repeat units without significantly departing from the scope of the recited "y" range(s) herein. Polyalkyleneimine polymers/oligomers useful according to the invention can be purchased and/or prepared by conventional methods known in the art.

Alternately, the polyalkyleneimines can be optionally treated under conditions sufficient to eliminate or reduce the number of primary amines (preferably without significant crosslinking), e.g., via reaction such as with a monoepoxide such as illustrated for a polyethyleneimine treated with 1,2-monoepoxyhexane (MEH) in FIG. 9, which can advantageously remove or reduce the likelihood that such primary amines could contribute to forming ammonium carbamates. Different monoepoxides can show different selectivities towards reaction with primary versus secondary amines to create different contents of potentially chemisorptive (and even physisorptive) species in the polyalkyleneimine. In such alternate embodiments, the monoepoxide can include, but are not limited to, terminal (1,2-) aliphatic epoxides, internal aliphatic epoxides, cyclic or multicyclic aliphatic epoxides, aromatic epoxides, aliphatic alkyleneoxides (e.g., having from 2 to 12 carbons, from 4 to 12 carbons, from 4 to 10 carbon atoms, or from 4 to 8 carbon atoms), or the like, substituted/functionalized or without substituents, or combinations thereof. Non-limiting examples of such monoepoxides can be purchased and/or prepared by conventional methods known in the art and can include, for example, ethylene oxide, propylene oxide, 1,2-epoxybutane, 2,3-epoxybutane, 1,2-epoxyhexane, 1,2-epoxyoctene, 1,2-epoxydecane, 1,2-epoxydodecane, 1,2-epoxy-2-methylbutane, styrene oxide, cyclohexene oxide, and combinations thereof. In certain of these embodiments, the monoepoxide may contain only C, H, and O atoms and can lack other heteroatoms such as halides, phosphorus, silicon, or nitrogen. Additionally or alternatively in these embodiment, the monoepoxide may contain only C, H, and O atoms and may contain only one O atom (that of the epoxide functionality). Further in such alternate embodiments, the optional treatment can yield a reaction product that is a polyalkyleneimine where some or all of the primary amines are converted to secondary and/or tertiary amines, which reaction product contains, by virtue of the epoxide reaction, one or more secondary hydroxyl groups. Still further in such alternate embodiments, treatment conditions, such as temperature, pressure and contact time, may vary greatly. Any suitable combination of such conditions may be employed herein that are sufficient to produce the desired polyalkyleneimines described herein; typically, the treatment can be carried out by combining the reactants in any order under ambient pressure with contact time varying from seconds to a few hours or greater. In various embodiments, the treated polyalkyleneimine can contain primary amines that have been doubly reacted with the monoepoxide to produce tertiary amines bearing two secondary hydroxyl moieties. Though a goal of treatment can be to eliminate primary amines from the polyalkyleneimine, the treated polyalkyleneimines can still contain some residual (reduced number of) unreacted primary amines. Additionally or alternately, the treated polyalkyleneimine can contain some primary amines that have reacted to form secondary and/or tertiary amines, but substantially no secondary amines in the treated polyalkyleneimine can be observed to have formed tertiary amines. Further additionally or alternately, the treated polyalkyleneimine can contain some primary amines that have reacted to form secondary amines, but substantially no primary amines that have further reacted to form tertiary amines.

The polyalkyleneimines useful in the methods according to the invention can exhibit only secondary amines (only unbranched cyclic, typically not subjected to the optional treatment), only primary and secondary amines (e.g., typically unbranched, linear or cyclic; typically not subjected to the optional treatment), only secondary and tertiary amines (e.g., typically but not necessarily subjected to the optional treatment), only primary and tertiary amines (highly uncommon and typically not subjected to the optional treatment), or primary and secondary and tertiary amines (which may or may not have been subjected to the optional treatment). In such cases where only primary and secondary amines are present, the average molar ratio of primary amines to secondary amines can range from about 2:1 to about 1:40, for example from about 2:1 to about 1:20, from about 2:1 to about 1:15, from about 1:1 to about 1:40, from about 1:1 to about 1:20, from about 1:1 to about 1:15, or from about 1:1 to about 1:10. In such cases where only secondary and tertiary amines are present, the average molar ratio of secondary amines to tertiary amines can range from about 15:1 to about 1:3, for example from about 10:1 to about 1:2 or from about 6:1 to about 1:1. In such cases where primary, secondary, and tertiary amines are all present, at least one or more of the following can advantageously apply: the average molar ratio of primary amines to secondary amines can range from about 5:1 to about 1:50, for example from about 5:1 to about 1:30, from about 5:1 to about 1:15, from about 3:1 to about 1:30, from about 3:1 to about 1:15, or from about 3:1 to about 1:10; the average molar ratio of secondary amines to tertiary amines can range from about 15:1 to about 1:10, for example from about 10:1 to about 1:5; and the average molar ratio of primary amines to tertiary amines can range from about 10:1 to about 1:50, for example from about 10:1 to about 1:30, from about 10:1 to about 1:20, from about 10:1 to about 1:10, from about 5:1 to about 1:10, from about 5:1 to about 1:30, from about 5:1 to about 1:20, or from about 5:1 to about 1:10.

Although only the polyalkyleneimines have been disclosed hereinabove to be optionally treated, e.g., with a monoepoxide, it should be understood that the primary and/or secondary amine sorbent materials can optionally have been similarly treated, so long as not all amine groups become tertiary amines, i.e., such that some primary and/or secondary amine groups in the sorbent materials remain.

One significant favorable aspect of the present non-aqueous ionic liquid promoter solvent based processes includes that amines can achieve separation comparable to aqueous separation systems utilizing hydroxyamines/alkanolamines such as MEA. Product stoichiometry, loading, and/or absorption/desorption kinetics may be further manipulated advantageously by varying the structure of the amines used (e.g., by attaching electron-withdrawing or donating groups) to provide different inherent basicities (pK$_b$'s) and/or steric properties. A useful means of making an adequate prediction of the pK$_a$ value of the amine can be the ACD/PhysChem Suite™ (a suite of software tools for the prediction of basic physicochemical properties including pK$_a$), available from Advanced Chemistry Development, Inc., 110 Yonge Street, Toronto, Ontario, Canada M5C 1T4.

The amine sorbents used in the processes according to the invention can advantageously exhibit a boiling point so as to avoid losses by evaporation, e.g., greater than about 70° C., especially when the regeneration/desorption step is carried out above about 100° C. When the sorbent is to be used for high temperature sorption at about 70° C., with regeneration at temperatures above about 100° C., the amine sorbent could potentially have a boiling point of about 120° C. or higher.

Ionic Liquid Solvents

Ionic liquids can contain essentially only ions rather than uncharged molecular species. Many ionic liquids can remain liquid over a wide temperature range, often spanning more than 300° C. They may have low melting points (as low as −96° C. has been reported), which can be attributed to relatively large asymmetric cations having relatively low lattice energies. The term "ionic liquid" is commonly used for salts whose melting point is relatively low (typically below about 100° C.) and which typically exhibit no substantial/measurable vapor pressure below their thermal decomposition temperature. The properties of ionic liquids can result from the composite properties of the wide variety of cations and, more importantly for the instant application, anions which may be present in these liquids. As a class of materials, ionic liquids can be highly solvating for both organic and inorganic materials. Many of them can be nonflammable, non-explosive, and/or have high thermal stability. They can also be recyclable, which can be helpful in reducing environmental concerns over their use. Ionic liquids have been found to be highly effective and synergistic promoter solvents for the amine sorbents used in the present processes.

A wide range of ionic liquids may be used as amine solvents in the present process. Ionic liquids with cations such as tetraalkylammonium, choline (tetraalkylammonium with a CH$_2$CH$_2$OH substituent), phosphonium (e.g., triethylmethylphosphonium, tri-n-butylmethylphosphonium, triisobutylmethyl phosphonium, trihexyltetradecylphosphonium, and the like, as well as combinations thereof), pyrazolium, pyridinium (e.g., 1-ethylpyridinium, 1-butylpyridinium, 1-butyl-4-methylpyridinium, and the like, as well as combinations thereof), pyrrolidinium (e.g., 1-ethyl-1-methylpyrrolidinium, 1-butyl-1-methylpyrrolidinium, and the like, as well as combinations thereof), sulfonium (e.g., triethylsulfonium), piperidinium (especially N,N-dialkylpiperidinium and/or the like), morpholinium (especially N,N-dialkylmorpholinium and/or the like), diazolium, and the like, as well as combinations thereof, may be found useful provided that their salts have suitable boiling points for use in the process. The anions may be organic or inorganic: anions such as carboxylate (e.g., acetate, propionate, hexanoate, octanoate, decanoate, and the like, as well as combinations thereof), lactate, benzoate, salicylate, thiosalicylate, tosylate, phenolate, thiophenolate, cyanate, thiocyanate, iodide, bromide, chloride, nitrite, nitrate, sulfate, hydrogen sulfate, sulfonate (e.g., methylsulfonate), phosphate, carbonate, and the like, as well as combinations thereof, may be found suitable. Anions with fluorine (such as trifluoromethyl sulfonate, tetrafluoroborate, and/or hexafluorophosphate), however, tend generally not be preferred when operating with incoming gas streams likely to contain water, in view of possible hydrolysis to form hydrogen fluoride with its accompanying corrosion problems.

Ionic liquids, which can possess the ability to function separately as chemisorbents, can constitute a preferred class of solvents, in view of their ability to increase the potential overall CO$_2$ uptake in the separation process. This preferred class of ionic liquids can be represented by those compounds whose cations have a C—H bond present as part of a conjugated —NC(H)N— structure and/or of an —NC(H)S— structure, more specifically designated as a —N═C(H)—N— structure and/or as an —N═C(H)—S— structure, for example, as in imidazolium, benzimidazolium, imidazolidinium (4,5-dihydro-1H-imidazolium), diazolium salts with a hydrogen at the 2-position, and/or thiazolium salts. These cations can contain a relatively acidic hydrogen atom, C(H), bonded to a potentially nucleophilic carbon atom. The carbon referred to as nucleophilic can be qualified as potentially nucleophilic, since the carbon itself typically does not become a nucleophile until deprotonation of the acidic hydrogen. Thus, cations that can be effective to achieve chemisorption of CO$_2$ to complement the main ionic liquid function as a stabilizing solvent for the amine CO$_2$ sorption products can advantageously be those in which the potentially nucleophilic carbon can bear a sufficiently acidic hydrogen (on a relative basis) to be susceptible to deprotonation by reaction of the cation and subsequent reaction with CO$_2$. Organic cations with pK$_a$ (acid dissociation equilibrium constant) values, as measured or predicted at ~25° C. in DMSO (dimethyl sulfoxide) solution and/or as measured in other solvent and converted to a DMSO value (referred to as DMSO equivalent scale), can be below about 26, for example from about 26 to about 15, from about 25 to about 16, or from about 24 to about 18 (based on the values in the Bordwell online pK$_a$ database, http://www.chem.wisc.edu/areas/reich/pkatable/index.htm); the lattermost range effectively covering the imidazolium compounds likely to provide enhanced/optimal CO$_2$ sorption by the ionic liquid. The salts derived from the imidazolium cation can be preferred, without being bound by theory, in some embodiments because their almost planar structure makes them have the character of amidines, particularly those derived from the 1,3-di(lower alkyl) imidazolium cations, where lower alkyl is C$_1$-C$_6$ (preferably C$_1$-C$_4$) alkyl. However, the 1,3-substituents of the imidazolium, benzimidazolium, and/or imidazolidinium cations and/or the N-substituents of the thiazolium cations may include or be other groups, such as aryl (including mesityl (2,4,6-trimethylphenyl)), higher alkyl (e.g., C$_7$-C$_{24}$), cycloalkyl, alkenyl (e.g., C$_1$-C$_6$), hydroxyalkyl (e.g., hydroxy-functionalized C$_1$-C$_6$), glycol ether, and substituted (C$_1$-C$_{16}$, e.g., C$_1$-C$_6$) alkyl, wherein a substituent of the alkyl group is a heteroatomic group, aryl, alkenyl, and/or other functionality. The imidazolium, benzimidazolium, thiazolium, and/or imidazolidinium cations may additionally or alternately bear substituents of similar nature at the ring carbon atom positions which do not react with CO$_2$ via the acidic hydrogen atom.

The pK$_a$ of the anion of the ionic liquid may be effective to vary the liquid's capability to react with CO$_2$. In this case, preferred anions for forming salts with the cations of the ionic liquid can include those in which the conjugate acid of the counterion has a pK$_a$ as measured and/or predicted at ~25° C. in aqueous solution (or as measured in other solvent and converted to an aqueous value, referred to as aqueous equivalent scale) of at least 0, for example of at least 2.0 or of at least 4.0. The anion of the ionic liquid salt can affect its ability to act as an agent for CO$_2$ capture, with more basic anions (such as acetate and/or thiocyanate) enhancing chemisorption and less basic anions (such as chloride) being ineffective and/or less effective in enhancing chemisorption. A useful means of making an adequate prediction of the pK$_a$ value of the counterion can include use of the ACD/PhysChem Suite™, mentioned above. A listing of representative $pK_a$ values is found in the Bordwell database.

A preferred class of imidazolium salts includes the 1,3-dialkyl substituted imidazolium salts, with preference for the acetate salts as exemplified by 1-ethyl-3-methyl imidazolium acetate and 1-butyl-3-methyl imidazolium acetate, but other salts may be considered, such as those with halide, thiocyanate, and/or lower alkyl chain carboxylate anions (including acetate, propionate, hexanoate, octanoate, decanoate, and the like, as well as combinations thereof) as well as methanesulfonate, thiocyanate, salicylate, tetracholoroaluminate-aluminum chloride, dioctylsulfosuccinate, alkylbenzenesulfonate (alkyl=e.g., dodecyl), trifluoromethyl sulfonate, sulfate, bromide, methanesulfonate, alkylsulfate, tetrachloroaluminate, dicyanamide, hexafluoroantimonate, bis(trifluoromethylsulfonyl) imide, iodide, trifluorosulfonate, nitrate, tosylate, bis(2,4,4-trimethylpentyl)phosphinate, dibutylphosphate, lactate, and the like, as well as combinations thereof.

The ionic liquid can function as a non-aqueous polar solvent that can favor the formation of carbamic acid products (which have a 1:1 non-tertiary amine:$CO_2$ stoichiometry) and inhibits the formation of carbamate products (2:1 stoichiometry). This function of the ionic liquid can increase sorbent capacity for $CO_2$ capture; it can additionally or alternately favor regeneration with a reduced temperature differential between the sorption and desorption phases of the cycle, as the carbamic acids tend to be less stable than the corresponding carbamates.

The amine sorbent can normally be substantially (completely) soluble in the ionic liquid solvent, permitting the amine to be used in a proportion conferring adequate $CO_2$ uptake while preferably not presenting viscosity increases substantial enough to impede ready circulation in the unit. Normally, at least about 10 wt % amine can be used, but amounts up to about 90 wt % can be used, since the function of the ionic liquid solvent can be reactive, in that it can promote the desired amine sorption mechanisms while suppressing less desired processes; relatively small proportions of the solvent may be found effective. In some embodiments, however, the amount of amine can be from 10 wt % to 60 wt % of the solvent/amine solution and, in most cases, from 10 wt % to 35 wt % amine in the sorbent solution. Normally, it is desirable to use amine concentrations below the level at which substantial insoluble precipitates can form on reaction with the $CO_2$. Because diamines and polyamines can offer the possibility of binding to the $CO_2$ by reaction at each nitrogen, it may be feasible to use less of these than monoamines for a given sorption capacity, but the same or similar amine:solvent ratios can be useful, unless viscosity increases with polyamines become a problem. Since the ionic liquid solvents may themselves act as chemisorbents for the $CO_2$, it may not be necessary to use relatively high concentrations of dissolved amine, thus presenting the possibility of achieving adequate $CO_2$ capture ratios while maintaining an acceptable solution viscosity. As discussed below, however, sorption by the amine appears to be a preferred mechanism, in that chemisorption by the solvent has been observed to take place after carbamic acid formation with the amine has taken place, indicating that an optimal amine concentration may exist for a given system sorption capacity.

In situations where polymeric amines are used, both the polymeric amine composition and the $CO_2$-sorbed polymeric amine complex can be inventive. Particularly where the polymeric amine composition includes a polyalkyleneimine treated to reduce or eliminate primary amine content, a novel polymeric amine composition can include the reaction product of a monoepoxide and a polyalkyleneimine oligomer in a non-aqueous aprotic solvent, wherein: the monoepoxide is an aliphatic alkyleneoxide having from 4 to 12 carbon atoms (e.g., from 4 to 10 carbons atoms or from 4 to 8 carbon atoms); the polyalkyleneimine oligomer is linear, cyclic, and/or branched and has the following repeat unit structure: —[$(CH_2)_x$—NR]$_y$—, where x is from 2 to 6 (e.g., is from 2 to 4, is from 2 to 3, or is 2), where y is from 4 to 50 (e.g., from 4 to 35, from 4 to 25, from 4 to 20, from 4 to 15, from 4 to 12, from 4 to 10, from 6 to 50, from 6 to 35, from 6 to 25, from 6 to 60, from 6 to 15, from 6 to 12, or from 6 to 10), and where R is hydrogen, an alkyleneamine branch having the structure —$(CH_2)_x$—$NH_2$, or an alkyleneimine branch having the structure —$(CH_2)_x$—$NR'_2$, wherein a first R' is either an alkyleneamine branch or another alkyleneimine branch and a second R' is hydrogen, another alkyleneamine branch, or yet another alkyleneimine branch; the reaction product comprises one or more secondary amines and one or more tertiary amines, as well as one or more hydroxyl groups (e.g., such as secondary hydroxyl groups from the monoepoxide treatment); the non-aqueous aprotic solvent is polar and has a dipole moment (D) of at least 1.7 (e.g., of at least 2, of at least 2.5, of at least 3, from 1.7 to 5, from 1.7 to 4.5, from 1.7 to 4, from 2 to 5, from 2 to 4.5, from 2 to 4, from 2.5 to 5, from 2.5 to 4.5, from 2.5 to 4, from 3 to 5, from 3 to 4.5, or from 3 to 4); and the polymeric amine composition has a viscosity at about 25° C. of about 10 cPs or less (e.g., about 7 cPs or less, about 5 cPs or less, about 4 cPs or less, or about 3 cPs or less) and a $CO_2$ adsorption efficiency of at least 0.5:1 moles $CO_2$/moles of primary plus secondary (non-tertiary) amine (e.g., at least 0.7:1 or at least 0.85:1). Furthermore, particularly where the $CO_2$-sorbed polymeric amine complex includes a complex of $CO_2$ with a polymeric amine composition containing a polyalkyleneimine treated under conditions sufficient to reduce or eliminate primary amine content, a novel $CO_2$-sorbed polymeric amine complex can include the reversible chemisorption complex of $CO_2$ with the reaction product of a monoepoxide and a polyalkyleneimine oligomer in a non-aqueous aprotic solvent, wherein: the monoepoxide is an aliphatic alkyleneoxide having from 4 to 12 carbon atoms (e.g., from 4 to 10 carbons atoms or from 4 to 8 carbon atoms); the polyalkyleneimine oligomer is linear, cyclic, and/or branched and has the following repeat unit structure: —[$(CH_2)_x$—NR]$_y$—, where x is from 2 to 6 (e.g., is from 2 to 4, is from 2 to 3, or is 2), where y is from 4 to 50 (e.g., from 4 to 35, from 4 to 25, from 4 to 20, from 4 to 15, from 4 to 12, from 4 to 10, from 6 to 50, from 6 to 35, from 6 to 25, from 6 to 60, from 6 to 15, from 6 to 12, or from 6 to 10), and where R is hydrogen, an alkyleneamine branch having the structure —$(CH_2)_x$—$NH_2$, or an alkyleneimine branch having the structure —$(CH_2)_x$—$NR'_2$, wherein a first R' is either an alkyleneamine branch or another alkyleneimine branch and a second R' is hydrogen, another alkyleneamine branch, or yet another alkyleneimine branch; the reaction product comprises one or more secondary amines and one or more tertiary amines, as well as one or more hydroxyl groups (e.g., such as secondary hydroxyl groups from the monoepoxide treatment); the non-aqueous aprotic solvent is polar and has a dipole moment (D) of at least 1.7 (e.g., of at least 2, of at least 2.5, of at least 3, from 1.7 to 5, from 1.7 to 4.5, from 1.7 to 4, from 2 to 5, from 2 to 4.5, from 2 to 4, from 2.5 to 5, from 2.5 to 4.5, from 2.5 to 4, from 3 to 5, from 3 to 4.5, or from 3 to 4); the polymeric amine composition has a viscosity at about 25° C. of about 10 cPs or less (e.g., about 7 cPs or less, about 5 cPs or less, about 4 cPs or less, or about 3 cPs or less) and a $CO_2$ adsorption efficiency of at least 0.5:1 moles $CO_2$/moles of primary plus secondary (non-tertiary) amine (e.g., at least 0.7:1 or at least 0.85:1); and the chemisorption complex is reversible at a temperature between 25° C. and 150° C. and includes one or more carbamic acid groups formed from interaction between the $CO_2$ and the primary and/or secondary amines of the composition. Although the chemisorption complex is identified above as including one or more carbamic acid groups, it should be understood that, under certain conditions, a carbamic acid group can lose its acid proton to form an ionic carbamate species, e.g., due to the basicity of the liquid sorbent medium in comparison to the pKa of the acid proton, which is also a reversible phenomenon and is meant to be encompassed by "one or more carbamic acid groups" in this context. However, it is preferable that the ionic carbamate, as much as possible, does not attain an ammonium counterion by utilizing a protonated amine from the liquid sorbent, as such would effectively reduce the efficiency of the sorbent system, because the amine group becoming protonated would otherwise have been capable of reversibly chemisorbing another molecule of $CO_2$ if not made into an ammonium counterion to the already sorbed $CO_2$/ionic carbamate species.

In certain embodiments, the solubility of the polymeric/oligomeric polyalkyleneimines and their $CO_2$ sorption complexes in various non-aqueous solvents can be fine tuned for the particular removal process. The ability to fine tune the solubility of the modified polyalkyleneimine materials and their $CO_2$ reaction products, e.g., by modifying hydrophobicity/hydrophilicity such as through changing the aliphatic monoepoxide hydrocarbon chain length can provide a handle to fine tune products and maximize loadings (and/or favorable absorption/desorption kinetics) through the exploitation of solvent effects.

Absorption/Desorption Conditions

The amine/ionic liquid sorbent system is not necessarily limited to removal of $CO_2$ but, in view of the system chemistry, can be capable of removing $H_2S$ and/or other acid gases such as those typically found in flue gas and/or wellhead natural gas.

The gas mixture containing carbon dioxide can originate from natural and/or artificial sources. The gas mixture can contain, in addition to carbon dioxide, one or more other gases, such as methane, ethane, n-butane, i-butane, hydrogen, carbon monoxide, ethene, ethyne, propene, nitrogen, oxygen, helium, neon, argon, krypton, hydrogen sulfide, and the like.

The constituents of the gas mixture may have different proportions. The amount of carbon dioxide in the gas mixture can typically be at least 1 percent by volume, for example at least 10 percent by volume or 50 percent by volume or greater. The gas mixture can include or be any of a variety of gases, for example, natural gas, flue gas, fuel gas, waste gas, air, or the like, or combinations thereof.

The absorption conditions (i.e., temperature, pressure, and/or the like) can advantageously be favorable for selectively absorbing the $CO_2$ component of the gas mixture to produce an absorption effluent gas stream having a reduced concentration of the absorbed component. The $CO_2$ loadings on the amine in normal operation may be less than the theoretical maximum of one carbamic acid group (from the $CO_2$) per active nitrogen, since complete sorption may not occur, e.g., as a result of the kinetics of the process when in operation on a full scale and/or as a result of other factors such as contact efficiency between the gas phase and the sorbent solution, corrosion concerns, and the like. The loadings actually achieved can depend on the amine, the efficiency of the contacting in the absorber, the average residence time in the absorber, and/or other factors. The initial nucleophilic reaction between the amine and the $CO_2$ tends to be relatively fast, and the second rearrangement of the zwitterion can supposedly take place instantaneously, implying that the sorption should typically not be dependent on average residence time in the absorber; the effectiveness and efficiency of the sparging and contacting may, however, create practical barriers to achieving maximal $CO_2$ sorption.

For absorption processes herein, the temperature can typically be in the range from about 20° C. to about 90° C., for example from about 25° C. to about 75° C., from about 45° C. to about 75° C., or from about 45° C. to about 90° C., with greater sorption typically achieved at lower temperatures within these ranges. In most cases, therefore, a maximum temperature for the sorption can be about 80° C. (or alternately about 70° C.). The sorption temperature can typically correlate in an inverse manner with the partial pressure of the $CO_2$ in the entering gas stream; higher $CO_2$ partial pressures can enable higher sorption temperatures to be used. For example, the lowest possible sorption temperature can be beneficial in treating feedstreams (e.g., flue gas) with ~100 mbar (~10 kPa) partial pressure of $CO_2$. Conversely, absorption can be achieved at much higher temperatures, possibly over 100° C., with feedstreams (e.g., natural gas streams) with much higher $CO_2$ pressure. For flue gas streams, for instance, it can be desirable to operate towards the higher end of the temperature range, since the flue gas can tend to be hot, unless initially cooled to make sorption more favorable. In each case, however, the absorption temperature can be tailored for the sorbent system in use and with regard to the desorption temperature required for that system. The possibility opened up by the use of low sorption temperatures from about 20° C. to about 50° C. or from about 20° C. to about 30° C., however, can offer the possibility of using desorption temperatures below 100° C., e.g., about 75° C. to about 90° C. or about 50° C. to about 90° C., respectively, with consequent savings in process energy requirements.

The absorption pressure can be in the range from about 0.1 barg (about 10 kPag) to about 20 barg (about 2 MPag), for example from about 0.1 barg (about 10 kPag) to about 10 barg (about 1 MPag). The partial pressure of carbon dioxide in the gas mixture can vary according to the gas composition and/or the pressure of operation, but can typically be from about 0.1 barg (about 10 kPag) to about 20 barg (about 2 MPag), for example from about 0.1 barg (about 10 kPag) to about 10 bar (about 1 MPag). The gas mixture can be contacted countercurrently or co-currently with the absorbent material at a gas hourly space velocity (GHSV) from about 50 (S.T.P.)/hour to about 50,000 (S.T.P.)/hour.

The low pressure of flue gas can, in general, represent a significant limitation for $CO_2$ recovery, since the $CO_2$ can be absorbed much more easily into solvents at higher pressures, but the cost of compression can be relatively high and can tend not to be favored with the present sorption systems with their high sorption capacities. The pressure when treating flue gas which enters from the combustion source at a low pressure is unlikely to exceed about 1 atmosphere gauge (~100 kPag) unless a separate means is utilized to increase pressure. Natural gas recovery and processing is commonly at a much higher pressure and may enter the treatment process at a pressure typically in the range from about 1 atm (~100 kPag) to about 90 atm (~9.1 MPag), with the actual value selected being dependent on pipelining specifications and/or the extent to which it is desired to eliminate recompression following treatment, for example.

The carbon dioxide can be desorbed from the absorbent material by one or more of several methods. One possibility can be to desorb the carbon dioxide by means of stripping with an inert (generally non-reactive) gas stream such as nitrogen in the regeneration tower. The reduction in the $CO_2$ partial pressure that can occur on stripping can promote desorption of the $CO_2$, and, when this expedient is used, a significant pressure reduction may not be required, although the pressure may be reduced for optimal/better stripping, suitably to the levels used in pressure swing operation. Additionally or alternately, a pressure swing process may be used to reduce the pressure on the liquid absorbent to a relatively lower value than that prevailing in the sorption phase.

When carrying out desorption by inert gas sparging and/or pressure swing operation, the temperature may be maintained at a value at or close to that used in the adsorption step. Desorption can, however, be favored by an increase in temperature, with or without stripping and/or a decrease in pressure.

When the absorbent is loaded with $CO_2$ to a satisfactory level, the sorbent system can be regenerated by desorption of the $CO_2$. Regeneration can be conveniently effected in a regeneration tower, e.g., by reducing the partial pressure of the $CO_2$ by stripping with a non-reactive gas such as nitrogen, by increasing the temperature of the amine rich stream from the absorber, and/or by reducing the pressure, or a combination of any of these expedients. During this step, the $CO_2$ may be removed and can be taken to utilization and/or sequestration and the sorbent medium freed for recycle to the absorber. An additional or alternative option can be to decompose the carbamate/carbamic acid with substantially pure $CO_2$ (previously isolated) at ~1 atm (~100 kPa partial pressure) or higher at relatively high temperatures, typically at least 120° C., at which the carbamic acid/carbamate reaction product can be decomposed. Stripping with a $CO_2$ stream at a desorption temperature of at least 120° C. and at a pressure greater than ~1 atm (~100 kPa partial pressure) may give a significant advantage in order to remove any water that may have entered the system since under these conditions; water can thus be removed from the amine/ionic liquid solution and can be separated from the $CO_2$ in a further downstream separation step, e.g., a pressure swing operation, for instance at an elevated temperature above ambient.

The desorption temperature can typically be, as noted above, about 120° C. or less, and successful desorption may be achievable at temperatures not exceeding about 100° C. (e.g., from about 70° C. to about 90° C., from about 70° C. to about 95° C., from about 75° C. to about 90° C., or from about 75° C. to about 95° C.), with lower values (e.g., from about 30° C. to about 70° C., from about 30° C. to about 50° C., or from about 50° C. to about 70° C.) if sorption is carried out at low temperature. In the non-aqueous environment using the ionic liquid solvent, stripping can be feasible with or without purge gas at relatively lower temperatures. The possibility of desorption at lower temperatures can offer the potential for isothermal (or near isothermal) stripping using a purge gas at a temperature the same as, or not much higher than, the sorption temperature (for example, at a temperature not more than 30° C. higher than the sorption temperature); in favorable cases, it may be possible to attain a sorption/desorption temperature differential of no more than 20° C.

It should be appreciated that conventional equipment can be used, in whole or in part, to perform the various functions of the non-aqueous amine scrubbing processes/steps described herein, such as monitoring and/or automatically regulating the flow of gases, e.g., to enable fully automated and/or continuous process control in an efficient manner.

EXAMPLES

Examples 1-6

Primary and secondary amines were subjected to $CO_2$ uptake experiments using an ionic liquid solvent. Solutions of certain selected amines identified in Table 1 dissolved in the selected imidazolium salt were prepared in a ~5 mm NMR tube fitted with a plastic cap and capillary dip tube. The concentration of the amine in the solvent is shown in the Table. The NMR tube was placed inside a ~5 mm narrow-bore Bruker Avance III™ 400 MHz NMR spectrometer with a QNP probe. $CO_2$ (~1 atm, or ~100 kPa partial pressure, and at ~3-5 cc/min flow, as measured by a Brooks 5896™ flow controller) was bubbled through the room temperature (~20-25° C.) solution for approximately 3 hours. After $CO_2$ purge at room temperature (~20-25° C.), typically for about 3-5 hours (without monitoring product intermediates), the extent of carboxylation of the amine was determined by NMR and is shown in the table. The NMR results also indicated that chemisorption by C-carboxylation of the ionic liquid had taken place with 2-ethoxyethylamine and 1,5-bis(methylamino)-3-oxapentane used with 1-ethyl-3-methylimidazolium acetate; this effect was noted when the amine had captured at least ~1 molar equivalent of $CO_2$ per (primary+secondary) amine in ~10-15 wt % solutions; no carboxylation of the ionic liquid solvent was observed when the amount of dissolved amine was increased to ~30 wt % for 1,5-bis(methylamino)-3-oxapentane. The ionic liquid may therefore be seen to have functioned synergistically both as a relatively high-polarity stabilizing solvent for the amine chemisorbents and as an independent secondary chemisorbent, yielding very large molar $CO_2$ uptake capacities.

Example 1

Reaction of EEA with $CO_2$ in
1-ethyl-3-methylimidazolium acetate

An approximately 50 wt % solution of EEA (predicted ~25° C. aqueous pKa ~8.92) dissolved in 1-ethyl-3-methylimidazolium acetate was treated with $CO_2$ at about 24° C. A new single resonance appeared in the $^{13}C$ NMR spectrum after treatment with the $CO_2$ at ~160.55 ppm, which indicated carbamic acid (—NH—$\underline{C}$OOH) and carbamate (—NH—$\underline{C}$OO⁻) species in a fast exchange mode through proton transfer. The $^1H$ NMR spectrum of the reacted solution indicated two new resonances at ~13.21 ppm and ~6.93 ppm. The first new peak was associated with carbamic acid (—OH) and carbamate counterion (—$NH_3^+$) protons in fast exchange. The second new peak was believed to reflect an —NH— resonance of both carbamic acid and carbamate species. Based on the relative integration of these two proton peaks, and taking into account integration of the $^{13}C$ peak at ~160.55 ppm versus the structural amine peak at ~65.67 ppm (—O—$\underline{C}H_2$—), $CO_2$ loading was calculated as ~91 mol % per (non-tertiary) amine with a majority of the reaction product in the carbamic acid form (~80.3 mol %) and a small amount of carbamate species (representing about 20% of amines, meaning ~10% of amines present as anions and ~10% as cations).

Figure 2:
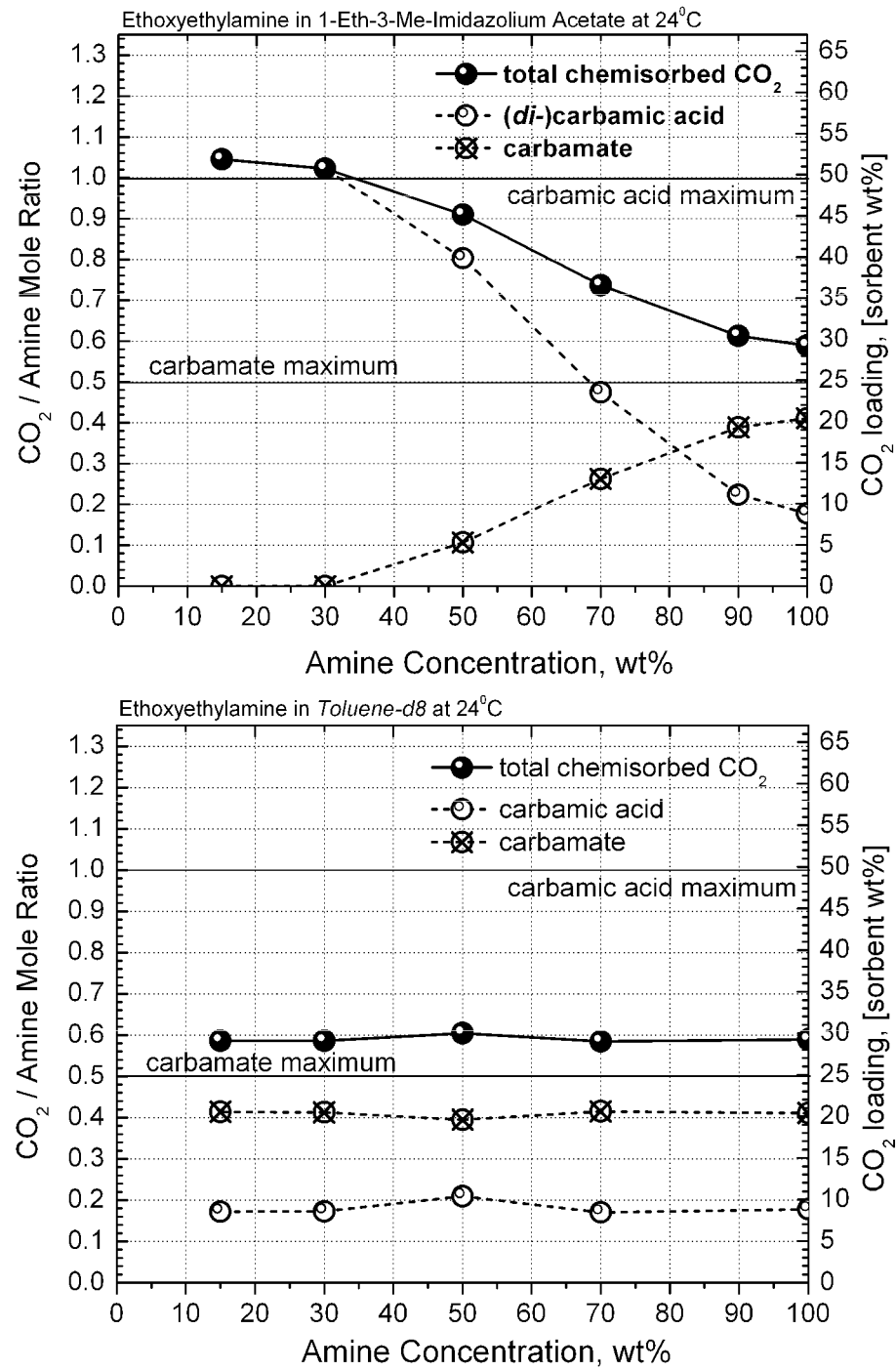
FIG. 2 shows the $CO_2$ uptake curves for 2-ethoxyethylamine (EEA) dissolved in 1-ethyl-3-methylimidazolium acetate (top) and toluene-$d_8$ (bottom).

The same procedure was carried out with about 15, about 30, about 70, and about 90 wt % of EEA in 1-ethyl-3-ethylimidazolium acetate solution. FIG. 2 (top) represents the $CO_2$ loading curve for these solutions with product speciation in each case. At higher amine concentrations (e.g., lower ionic liquid concentrations), carbamic acid yield dropped, giving rise to carbamate species. However, at low amine concentrations (e.g., higher concentrations of ionic liquid), each amine appeared to react with $CO_2$ forming carbamic acid species, while no carbamate was detected (FIG. 2, top). A small amount of primary amine (EEA) reacted with two $CO_2$ molecules, presumably forming dicarbamic acid species, —N—$(COOH)_2$, with a $^{13}C$ resonance detected around 158.05-

158.15 ppm (not shown). The relative amounts of such species were: ~8 mol % for ~15 wt % EEA, and ~3 mol % for ~30 wt % EEA.

Comparative Example C1

Reaction of EEA with $CO_2$ in $d_8$-toluene

A procedure similar to that described in Example 1 was performed using EEA dissolved in toluene-$d_8$ at various concentrations. FIG. 2 (bottom) illustrated that, in contrast to the ionic liquid solvent of Example 1, a solvent such as toluene did not appear to influence the equilibrium between (non-tertiary) amine-$CO_2$ reaction products over a broad amine concentration range. At all studied concentrations, the majority of reaction products between EEA and $CO_2$ were in the carbamate form, while less than ~20 mol % of (non-tertiary) amine formed a carbamic acid (as evidenced by NMR spectra, not shown), which produced much lower $CO_2$ uptake per (non-tertiary) amine relative to that achieved in Example 1.

Example 2

Reaction of APN with $CO_2$ in 1-ethyl-3-methylimidazolium acetate

In order to study the influence of amine basicity on amine-$CO_2$ product equilibrium and regeneration, an approximately 50 wt % solution of APN (~25° C. aqueous pKa ~7.7) in 1-ethyl-3-methylimidazolium acetate was treated with $CO_2$ at about 24° C. A new single $^{13}C$ resonance appeared in the $^{13}C$ NMR spectrum at ~160.11 ppm after treatment with the $CO_2$, which indicated carbamic acid (—NH—COOH) and carbamate (—NH—COO$^-$) species in a fast exchange mode through proton transfer. The $^1H$ NMR spectrum of the reacted solution indicated two new resonances at ~11.28 ppm and ~6.38 ppm. The first new peak was associated with the protons of carbamic acid (—OH) and carbamate counterion (—$NH_3$+) in fast exchange. The second new peak appeared to reflect the —NH— resonance of both carbamic acid and carbamate species. Based on the relative integration of these two proton peaks, and taking into account integration of the $^{13}C$ peak at ~160.11 ppm versus the structural amine peaks at ~119.22 and ~117.86 ppm (—C≡N), a $CO_2$ loading of ~85.9 mol % per (non-tertiary) amine was calculated, with a majority of reaction products in the carbamic acid form (~71.9 mol %) and a small amount of carbamate species (about 28 mol % of non-tertiary amine).

Figure 3:
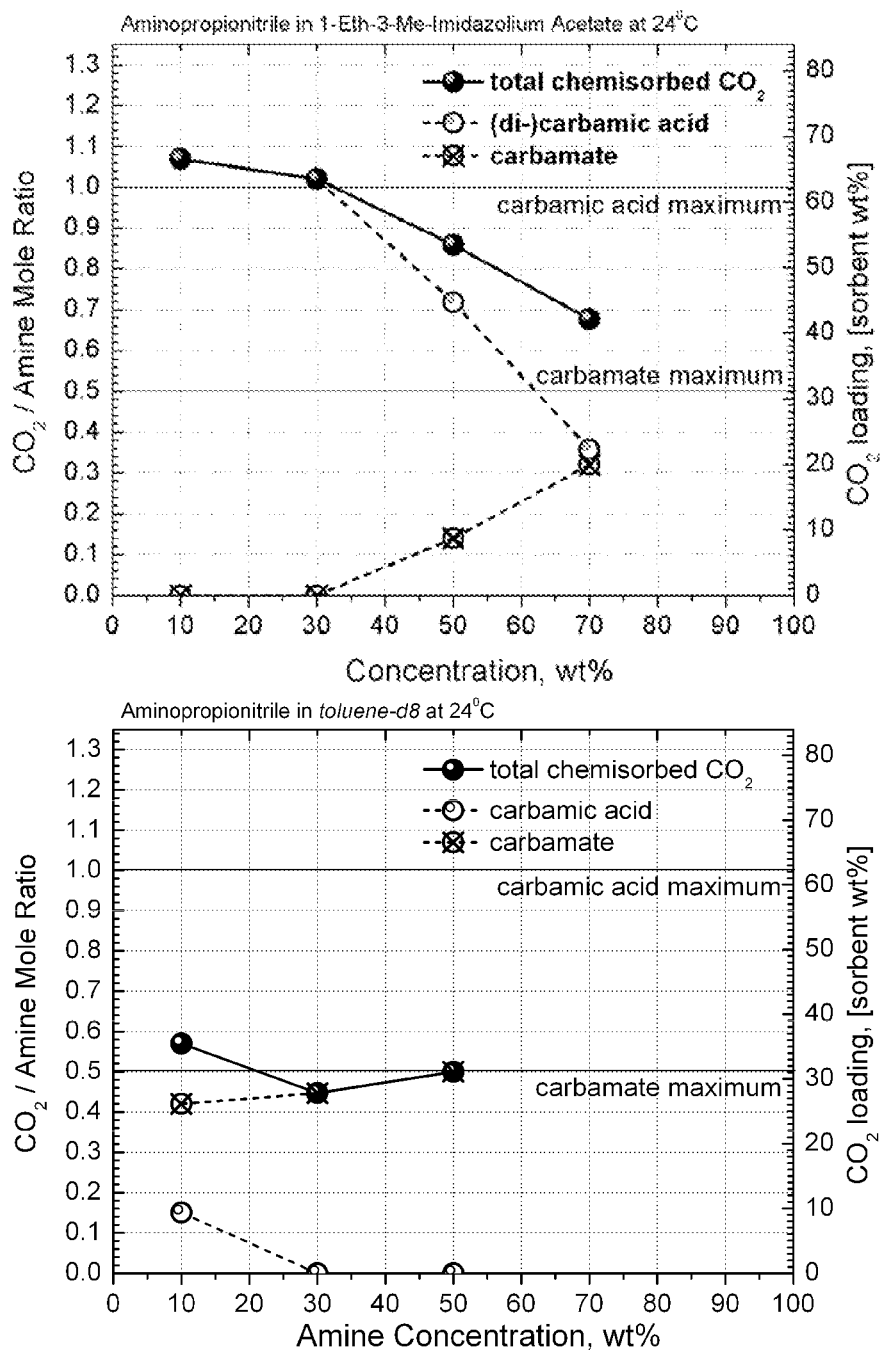
FIG. 3 shows the $CO_2$ uptake curves for 3-aminopropionitrile (APN) dissolved in 1-ethyl-3-methylimidazolium acetate (top) and toluene-$d_8$ (bottom).

The same procedure was carried out with about 10 wt %, about 30 wt %, and about 70 wt % of APN in 1-ethyl-3-methylimidazolium acetate solution. FIG. 3 (top) represents the $CO_2$ loading curve for these solutions with product speciation in each case. At higher amine concentrations (e.g., lower ionic liquid concentrations) carbamic acid yield dropped, giving rise to carbamate species. At amine concentration higher than ~70 wt %, the reaction products precipitated from solution. However, at low amine concentrations (e.g., higher concentrations of ionic liquid), the amine appeared to react with $CO_2$ forming carbamic acid species, while no carbamate was detected (FIG. 3, top). A small amount of APN appeared to react with two $CO_2$ molecules, presumably forming dicarbamic acid species —N—$(COOH)_2$, with a $^{13}C$ resonance detected around 157.50-157.65 ppm in the $^1H$ NMR spectrum (not shown). The relative amounts of such species were: 8.1 mol % for 10 wt % APN, and 0.8 mol % for 30 wt % APN.

Figure 4:
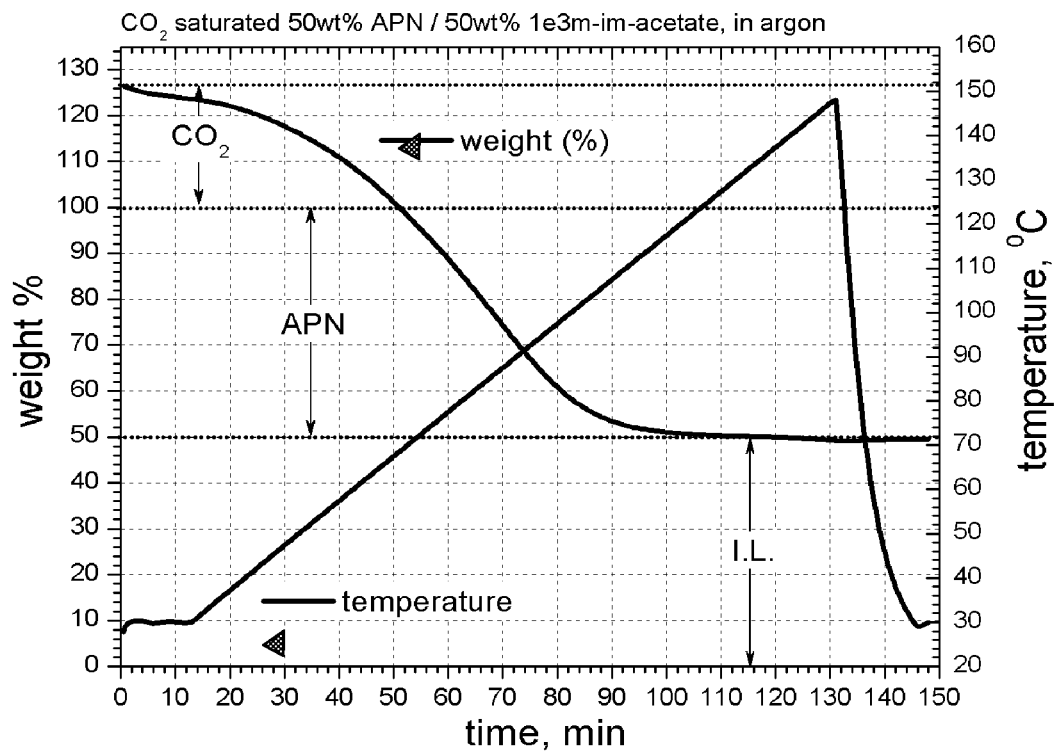
FIG. 4 shows the Thermogravimetric Analysis (TGA) weight loss curve for $CO_2$ saturated 50 wt % APN dissolved in 1-ethyl-3-methylimidazolium acetate.

The $CO_2$-saturated sample containing ~50 wt % APN in 1-ethyl-3-methylimidazolium acetate was used for TGA weight loss experiments in order to study $CO_2$ desorption and sample decomposition. According to prior NMR analysis (FIG. 3, top), the sample gained ~53.5 wt % per amine, or ~26.7 wt % per total sample weight (amine+ionic liquid) due to $CO_2$ absorption. During slow heating at ~1° C./min under an argon atmosphere, the sample gradually lost weight from $CO_2$ desorption, followed by vaporization of the regenerated APN (FIG. 4—$CO_2$ absorption, left axis, curve decreasing from initial temperature of ~126%, right axis, increasing ramp). By ~120° C., substantially all $CO_2$ was desorbed and APN was volatilized, while the ionic liquid (b.p. ~289° C.) was still present in the sample in the liquid phase. Vaporized amine could be separated from desorbed $CO_2$ using various processes, including amine condensation.

Comparative Example C2

Reaction of APN with $CO_2$ in $d_8$-toluene

A procedure similar to that described in Example 2 was performed using APN dissolved in toluene-$d_8$ at various concentrations. FIG. 3 (bottom) illustrates that, in contrast to the ionic liquid solvent of Example 2, a non-polar, non-aqueous solvent such as toluene did not influence the equilibrium of the amine-$CO_2$ reaction. A majority of reaction products between APN and $CO_2$ were in the carbamate form, while less than ~15 mol % of (non-tertiary) amine formed a carbamic acid, as evidenced by NMR spectra (not shown), which provided much lower $CO_2$ uptake per (non-tertiary) amine relative to that achieved in Example 2.

Example 3

Reaction of BMAP with $CO_2$ in 1-ethyl-3-methylimidazolium acetate

An approximately 43 wt % solution of BMAP (predicted ~25° C. aqueous pKa ~9.87) in 1-ethyl-3-methylimidazolium acetate was treated with $CO_2$ at about 24° C. A new single $^{13}C$ resonance appeared in the $^{13}C$ spectrum after treatment with $CO_2$ at ~159.46 ppm, which appeared to indicate carbamic acid (—NH—COOH) and carbamate (—NH—COO$^-$) species in a fast exchange mode through proton transfer. The $^1H$ NMR spectrum of the reacted solution (not shown) indicated one new resonance at ~12.43 ppm. The new peak was believed to be associated with the protons of carbamic acid (—OH) and carbamate counterion (—$NH_3$+) in fast exchange. Based on the integration of the $^{13}C$ peak at ~159.46 ppm versus the structural amine peak at ~68.74 ppm, a $CO_2$ loading of ~95.9 mol % per each (non-tertiary) amine of BMAP was calculated, with a majority of reaction products appearing to be in the carbamic acid form.

The same procedure was carried out with about 15 wt % of BMAP in 1-ethyl-3-methylimidazolium acetate solution. About 100 mol % $CO_2$ loading of per each (non-tertiary) amine of BMAP was detected, with all reaction products appearing to be in the carbamic acid form.

Example 4

Reaction of EEA with $CO_2$ in 1-ethyl-3-methylimidazolium thiocyanate

An approximately 20 wt % solution of EEA (~25° C. aqueous pKa ~8.92) in 1-ethyl-3-methylimidazolium thiocyanate was treated with $CO_2$ at about 24° C. A new single $^{13}C$ resonance appeared in the $^{13}C$ NMR spectrum after treatment with $CO_2$ at ~160.49 ppm, which appeared to indicate carbamic acid (—NH—COOH) and carbamate (—NH—COO⁻) species in a fast exchange through proton transfer. The $^1H$ NMR spectrum of the reacted solution (not shown) indicated two new resonances at ~8.83 ppm and ~6.35 ppm. The first new peak was believed to be associated with the protons of carbamic acid (—OH) and carbamate counterion (—NH$_3$+) in fast exchange. The second new peak appeared to reflect the —NH— resonance of both carbamic acid and carbamate species. Based on the integration of the $^{13}C$ peak at ~160.49 ppm versus three structural amine peaks at ~69.36, ~66.29, and ~65.78 ppm, a $CO_2$ loading of ~70.3 mol % per (non-tertiary) amine of EEA was calculated.

The $CO_2$ uptakes achieved in Examples 1 to 4 are given in Table 1 below.

TABLE 1

Examples for $CO_2$ Uptake for Amine Sorbents in Ionic Liquid Solvents

| Ex. No. | Amine | Conc. (wt %) | Ionic Liquid Solvent | Mol % yield of $CO_2$ per amine |
|---|---|---|---|---|
| 1 | 2-ethoxyethylamine | ~15 | 1-ethyl-3-methylimidazolium acetate | ~104.5[a] |
| 1 | 2-ethoxyethylamine | ~30 | 1-ethyl-3-methylimidazolium acetate | ~102.2[a] |
| 1 | 2-ethoxyethylamine | ~50 | 1-ethyl-3-methylimidazolium acetate | ~91.0 |
| 1 | 2-ethoxyethylamine | ~70 | 1-ethyl-3-methylimidazolium acetate | ~73.7 |
| 1 | 2-ethoxyethylamine | ~90 | 1-ethyl-3-methylimidazolium acetate | ~61.3 |
| 2 | 3-aminopropionitrile | ~10 | 1-ethyl-3-methylimidazolium acetate | ~107.0[a] |
| 2 | 3-aminopropionitrile | ~30 | 1-ethyl-3-methylimidazolium acetate | ~102.2[a] |
| 2 | 3-aminopropionitrile | ~50 | 1-ethyl-3-methylimidazolium acetate | ~85.9 |
| 2 | 3-aminopropionitrile | ~70 | 1-ethyl-3-methylimidazolium acetate | ~67.7 |
| 2 | 3-aminopropionitrile | ~90 | 1-ethyl-3-methylimidazolium acetate | solid |
| 3 | 1,5-bis(methylamino)-3-oxapentane | ~15 | 1-ethyl-3-methylimidazolium acetate | ~100[b] |
| 3 | 1,5-bis(methylamino)-3-oxapentane | ~43 | 1-ethyl-3-methylimidazolium acetate | ~95.9 |
| 4 | 2-ethoxyethylamine | ~20 | 1-ethyl-3-methylimidazolium thiocyanate | ~70.3 |

[a]Combined two products in single carbamic (~160.0 ppm) and dicarbamic acid (~158 ppm).
[b]Overlapping of carbamic acid peak at ~160.3 ppm with by-product peak at ~159.52 ppm may introduce a small error in calculation.

What is claimed is:

1. A cyclic process for separating $CO_2$ from a gas stream, which process comprises:
    a) contacting the gas stream with a non-aqueous absorbent comprising a solution of an amine sorbent in an ionic liquid having a counterion derived from an organic acid with a pKa of at least 0 (25° C. aqueous equivalent scale) to sorb $CO_2$ into the solution thereby producing a rich solution containing the sorbed $CO_2$; wherein the absorbent sorbs $CO_2$ by stabilization of a carbamic acid species relative to a carbamate species; and
    b) treating the rich solution under conditions sufficient to cause desorption of at least a portion of the $CO_2$ and to regenerate the amine.

2. The process of claim 1 in which the ionic liquid has a non-fluorine containing counterion.

3. The process of claim 1 in which the absorbent sorbs $CO_2$ at a molar loading capacity of $CO_2$:amine group above a value of 0.5:1.

4. The process of claim 1 in which the amine is a primary amine and the absorbent sorbs $CO_2$ at a molar loading capacity of $CO_2$:amine group above a value of 1:1.

5. The process of claim 1, wherein the amine sorbent comprises a primary aliphatic amine.

6. The method of claim 5, wherein the primary aliphatic amine comprises monoethanolamine, 2-amino-2-methyl-1-propanol, 2-(2-aminoethylamino)ethanol, 2-amino-2-hydroxymethyl-1,3-propanediol, diglycolamine, 2-ethoxyethylamine, 2-n-propoxyethylamine, 1,5-diamino-3-oxapentane, 3-aminopropionitrile, aminoacetonitrile, hydroxyethylenediamine, or a combination thereof.

7. The process of claim 1, wherein the amine sorbent comprises a secondary aliphatic amine.

8. The method of claim 7, wherein the secondary aliphatic amine comprises diethanolamine, diisopropanolamine, 1,5-bis(methylamino)-3-oxapentane, bis(2-methoxyethyl)amine, bis(2-ethoxyethyl)amine, 3,3'-iminodipropionitrile, or a combination thereof.

9. The process of claim 1, wherein the ionic liquid comprises an imidazolium, benzimidazolium, imidazolidinium, or thiazolium salt.

10. The process of claim 9, wherein the imidazolium salt is a salt having a counterion derived from an organic acid having a $pK_a$ of at least 4.

11. The process of claim 9, wherein the imidazolium salt is an acetate salt of a 1,3-dialkyl imidazolium cation.

12. The process of claim 1, wherein the gas stream is contacted with the amine sorbent at a first temperature to sorb $CO_2$ into the solution and treated to desorb the $CO_2$ and to regenerate the amine at a second temperature which is greater than the first temperature.

13. The process of claim 12, wherein the first temperature is from 25° C. to 50° C. and the second temperature is not greater than 100° C.

14. The process of claim 12, wherein the second temperature is greater than 100° C.

15. The process of claim 1, wherein when the amine sorbent comprises one or more non-tertiary amine groups, the amount of $CO_2$ sorbed into the solution is at least 0.70 moles per non-tertiary amine group in the amine.

16. A process of separating $CO_2$ from a mixed gas stream in a continuous cyclic sorption-desorption process which comprises:
   a) contacting the gas stream in a gas/liquid sorption zone with a circulating stream of a non-aqueous liquid sorbent medium comprising an aliphatic primary amine and/or aliphatic secondary amine dissolved in an ionic liquid having a counterion derived from an organic acid with a pKa of at least 0 (25° C. aqueous equivalent scale) under conditions to form a rich solution of $CO_2$ sorbed in the liquid sorbent medium; wherein the liquid sorbent medium sorbs $CO_2$ by stabilization of a carbamic acid species relative to a carbamate species;
   b) passing the rich solution to a regeneration zone in which $CO_2$ is desorbed from the rich solution under conditions required for desorption of the $CO_2$ thereby forming a regenerated lean solution with reduced $CO_2$ content; and
   c) cycling the resulting regenerated lean solution to the sorption zone.

17. The process of claim 16 in which the ionic liquid has a non-fluorine containing counterion.

18. The process of claim 16 in which the liquid sorbent medium sorbs $CO_2$ at a molar loading capacity of $CO_2$:amine group above a value of 0.5:1.

19. The process of claim 16 in which the amine is a primary amine and the liquid sorbent medium sorbs $CO_2$ at a molar loading capacity of $CO_2$:amine group above a value of 1:1.

20. The process of claim 16, wherein the aliphatic amine comprises a primary amine including monoethanolamine, 2-amino-2-methyl-1-propanol, 2-(2-aminoethylamino)ethanol, 2-amino-2-hydroxymethyl-1,3-propanediol, diglycolamine, 2-ethoxyethylamine, 2-n-propoxyethylamine, 1,5-diamino-3-oxapentane, 3-aminopropionitrile, aminoacetonitrile, hydroxyethylenediamine, or a combination thereof.

21. The process of claim 16, wherein the aliphatic amine comprises a secondary amine including diethanolamine, diisopropanolamine, 1,5-bis(methylamino)-3-oxapentane, bis(2-methoxyethyl)amine, bis(2-ethoxyethyl)amine, 3,3'-iminodipropionitrile, or a combination thereof.

22. The process of claim 16, wherein the ionic liquid has a cation with an acidic hydrogen atom which is bonded to a potentially nucleophilic carbon atom in a conjugated —NC(H)N— structure or —NC(H)S— structure.

23. The process of claim 22, wherein the ionic liquid solvent comprises a 1,3-dialkyl imidazolium, imidazolidinium, benzimidazolium, or thiazolium salt.

24. The process of claim 23, wherein the salt is a 1,3-dialkyl imidazolium, imidazolidinium, benzimidazolium, or thiazolium salt having a counterion derived from an organic acid with a $pK_a$ of at least 4.0.

25. The process of claim 24, wherein the 1,3-dialkyl imidazolium or imidazolidinium salt is an acetate salt.

26. The process of claim 16, wherein the gas stream is contacted with the liquid sorbent medium at a first temperature to sorb $CO_2$, and the rich solution is treated to desorb the $CO_2$ and to regenerate the amine at a second temperature which is greater than the first temperature.

27. The process of claim 26, wherein the second temperature is not more than 30° C. higher than the first temperature.

28. The process of claim 16, wherein the amount of $CO_2$ sorbed into the solution is at least 0.70 moles per non-tertiary amine group in of the amine.

* * * * *